(12) United States Patent
Meng

(10) Patent No.: US 10,437,111 B2
(45) Date of Patent: Oct. 8, 2019

(54) PIXEL ELECTRODE AND ARRAY SUBSTRATE

(71) Applicant: Shenzhen China Star Optoelectronics Technology Co., Ltd., Shenzhen (CN)

(72) Inventor: Xiaolong Meng, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/552,223

(22) PCT Filed: Jun. 30, 2017

(86) PCT No.: PCT/CN2017/091060
§ 371 (c)(1),
(2) Date: Aug. 18, 2017

(87) PCT Pub. No.: WO2018/232778
PCT Pub. Date: Dec. 27, 2018

(65) Prior Publication Data
US 2018/0364508 A1    Dec. 20, 2018

(30) Foreign Application Priority Data

Jun. 19, 2017  (CN) .......................... 2017 1 0465381

(51) Int. Cl.
*G02F 1/1343*    (2006.01)
*G02F 1/133*    (2006.01)
(Continued)

(52) U.S. Cl.
CPC ........ *G02F 1/1343* (2013.01); *G02F 1/13306* (2013.01); *G02F 1/133707* (2013.01); *G09G 3/36* (2013.01); *G02F 2001/134345* (2013.01)

(58) Field of Classification Search
None
See application file for complete search history.

(56) References Cited

U.S. PATENT DOCUMENTS

2004/0239650 A1* 12/2004 Mackey ................. G06F 3/044
345/174
2012/0069283 A1*  3/2012 Kizu ................. G02F 1/133707
349/141
(Continued)

FOREIGN PATENT DOCUMENTS

CN          101770117 A          7/2010
CN          102495500 A          6/2012
(Continued)

*Primary Examiner* — Ryan Crockett
(74) *Attorney, Agent, or Firm* — Mintz Levin Cohn Ferris Glovsky and Popeo, P.C.; Kongsik Kim; Jhongwoo Jay Peck

(57) ABSTRACT

A pixel electrode, including keel electrodes for dividing the pixel electrode into at least two electrode regions, a plurality of stripe-shaped branch electrodes disposed in each of the electrode regions, one of two ends of the branch electrodes connecting to the keel electrodes, and the branch electrodes in each of the electrode regions extending in the same direction and disposed in parallel. At least one connecting electrode disposed in each of the electrode regions, and connecting to at least two branch electrodes. An array substrate is also disclosed including the pixel electrode.

16 Claims, 8 Drawing Sheets

(51) Int. Cl.
*G09G 3/36* (2006.01)
*G02F 1/1337* (2006.01)

(56) References Cited

U.S. PATENT DOCUMENTS

| | | | | |
|---|---|---|---|---|
| 2012/0169981 A1* | 7/2012 | Murata | ............. | G02F 1/134363 |
| | | | | 349/138 |
| 2012/0307190 A1* | 12/2012 | Zhang | ............... | G02F 1/133707 |
| | | | | 349/142 |
| 2012/0314154 A1* | 12/2012 | Zhang | .................... | G02F 1/1333 |
| | | | | 349/58 |
| 2016/0246135 A1* | 8/2016 | Tae | .................... | G02F 1/133753 |
| 2018/0335675 A1* | 11/2018 | Ye | ...................... | G02F 1/133707 |
| 2018/0364528 A1* | 12/2018 | Yeh | .................... | G02F 1/136286 |

FOREIGN PATENT DOCUMENTS

| CN | 102629056 A | 8/2012 |
|---|---|---|
| CN | 106444174 A | 2/2017 |

* cited by examiner

PIXEL ELECTRODE AND ARRAY SUBSTRATE

CROSS-REFERENCE TO RELATED APPLICATION

This application is the U.S. national phase of PCT Application No. PCT/CN2017/091060 filed on Jun. 30, 2017, which claims priority to CN Patent Application No. 201710465381.4 filed on Jun. 19, 2017, the disclosures of which are incorporated in their entirety by reference herein.

TECHNICAL FIELD

The present disclosure relates to a liquid crystal display panel technology, and particularly to, a pixel electrode and an array substrate.

BACKGROUND ART

A Liquid Crystal Display (LCD) has many advantages of a thin body, power saving, no radiation, etc., and is widely used in, such as: a liquid crystal TV, a mobile phone, a Personal Digital Assistant (PDA), a digital camera, a computer screen or a laptop screen, etc., thereby occupying a dominant status in the flat panel display field.

An Active Thin Film Transistor-LCD (TFT-LCD) is the most popular LCD in the mainstream market at present, and according to different liquid crystal drive manners, may be roughly divided into: a Twisted Nematic (TN) or a Super Twisted Nematic (STN) type, an In-Plane Switching (IPS) type, and a Vertical Alignment (VA) type. The VA type of LCD has an extremely high contrast in comparison with other types of LCDs, and is very widely used in a large size display, e.g., a TV and so on. Furthermore, a High Vertical Alignment (HVA) type is an important branch in the VA mode.

A liquid crystal display device generally includes a housing, a liquid crystal panel and a Backlight module, the liquid crystal panel and the backlight module being disposed in the housing. A structure of the liquid crystal panel is mainly constituted by a Thin Film Transistor Array Substrate (TFT Array Substrate), a Color Filter Substrate (CF Substrate), and a Liquid Crystal Layer configured between the two substrates; and an operation principle thereof is to control a rotation of liquid crystal molecules of the Liquid Crystal Layer by applying a driving voltage to two sheets, e.g., pixel electrodes of the TFT Substrate and a common electrode of the CF Substrate, and to generate a picture by refracting light of the Backlight module.

When an alignment is performed, since the pixel electrodes is connected with each other, the voltage is caused to be abnormal, resulting in an abnormal alignment of liquid crystal light. At the beginning of establishing an electric field, when the voltage rises to about 2.0V, a domain segmentation "vortex" appears between the pixel electrodes (as shown in FIG. 1); under normal circumstances, the domain segmentation "vortex" may slowly spread to the entire pixel electrodes; however, since the pixel electrodes on the array substrate are connected, when there is an electric field around boundaries of the pixel electrodes, and a strength of the electric field is not significantly different, the domain segmentation "vortex" may also appear at connections of the pixel electrodes, and the domain segmentation may be affected and is not completed, thereby causing the alignment to have a disordered domain (vortex) phenomenon.

SUMMARY

In order to overcome the shortcomings of the prior art, the present disclosure provides a pixel electrode and an array substrate to resolve the disordered domain phenomenon, thereby improving a transmissivity.

The present disclosure provides a pixel electrode, including keel electrodes for dividing the pixel electrode into at least two electrode regions; a plurality of stripe-shaped branch electrodes disposed in each of the electrode regions, one of two ends of the branch electrodes connecting to the keel electrodes, and the branch electrodes in each of the electrode regions extending in the same direction and disposed in parallel; and at least one connecting electrode disposed in each of the electrode regions, and connecting to at least two branch electrodes.

Further, extension directions of the branch electrodes in adjacent two electrode regions are different.

Further, the keel electrodes are disposed to be two and cross each other in a crisscross shape.

Further, the pixel electrode also includes a rectangular border electrode, which is disposed with the keel electrodes, the branch electrodes and the connecting electrode therein and connected to two ends of the keel electrodes and the other end of the branch electrodes.

Further, a closest distance between the connecting electrode and the keel electrodes is greater than or equal to 15 µm.

Further, a length and a width of the connecting electrode are 2 to 10 µm.

Further, a width of the keel electrodes is greater than 3 µm.

Further, the connecting electrode in each of the electrode regions is disposed to be one, and connected to more than three branch electrodes.

Further, the connecting electrode in each of the electrode regions is disposed to be more than two.

The present disclosure further provides an array substrate, including the pixel electrode.

In comparison with the prior art, in the present disclosure, the pixel electrode is segmented into the at least two electrode regions; and the at least one connecting electrode is disposed in each of the electrode regions, and is connected to the at least two branch electrodes, so that when the alignment a voltage begins to be applyied in the voltagean alignment process, there will be a slightly disordered domain case phenomenon occurs at the connecting electrode. As the alignment voltage strengthens, the liquid crystals at a periphery of the pixel electrode and in a vicinity of the keel electrodes are orderly deflected by the common electrode, and the liquid crystals at a periphery of the connecting electrode are extruded by the common electrode, thereby driving the liquid crystals located at the connecting electrode in the pixel electrode to be orderly deflected; and finally a fully segmented state is realized in every direction, thereby avoiding the disordered domain phenomenon and effectively improving a transmissivity.

DETAILED DESCRIPTION OF EXEMPLARY EMBODIMENTS

The present disclosure is further described in details below in conjunction with the drawings and the embodiments.

Figure 1:
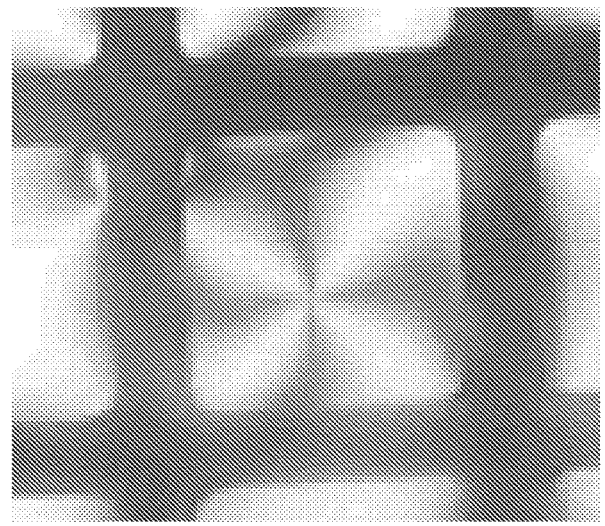
FIG. 1 is a schematic diagram where the domain segmentation "vortex" appears in the pixel electrode in the prior art.
Figure 2:
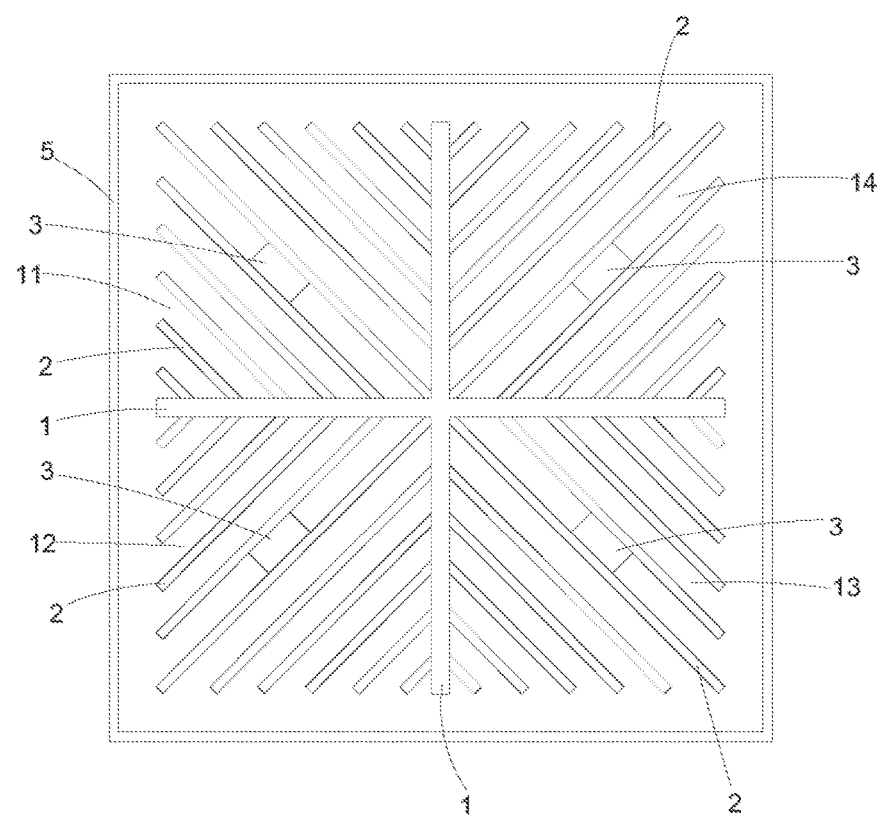
FIG. 2 is a structural schematic diagram of the pixel electrode of Embodiment 1 of the present disclosure.

As shown in FIG. 2, each of the pixel electrodes is surrounded by a common electrode, and includes keel electrodes 1 for dividing the pixel electrode into at least two electrode regions; a plurality of stripe-shaped branch electrodes 2 disposed in each of the electrode regions, one of two ends of the branch electrodes 2 connecting to the keel electrodes 1, and the branch electrodes 2 in each of the electrode regions extending in the same direction and disposed in parallel; and at least one connecting electrode 3 disposed in each of the electrode regions, and connecting to at least two branch electrodes 2. The extension directions of the branch electrodes 2 in the adjacent two electrode regions are different. Specifically, the keel electrodes 1 are disposed to be two, and cross each other in a crisscross shape, thereby dividing the pixel electrode into four electrode regions, i.e., a first electrode region 11, a second electrode region 12, a third electrode region 13 and a fourth electrode region 14, respectively; and the branch electrodes 2 in the first electrode region 11 and the third electrode region 13 are parallel, and the branch electrodes 2 in the second electrode region 12 and the fourth electrode region 14 are parallel.

The pixel electrode in the present disclosure may further includes a rectangular border electrode 4. The keel electrodes 1, the branch electrodes 2 and the connecting electrode 3 are disposed in the border electrode 4, two ends of the keel electrodes 1 are connected to the border electrode 4, and the other end of the branch electrodes 2 are connected to the border electrode 4.

In the present disclosure, a closest distance between the connecting electrode 3 and the keel electrodes 1 is greater than or equal to 15 μm; a length and a width of the connecting electrode 3 are 2 to 10 μm; and a width of the keel electrodes 1 is greater than 3 μm.

Figure 8:
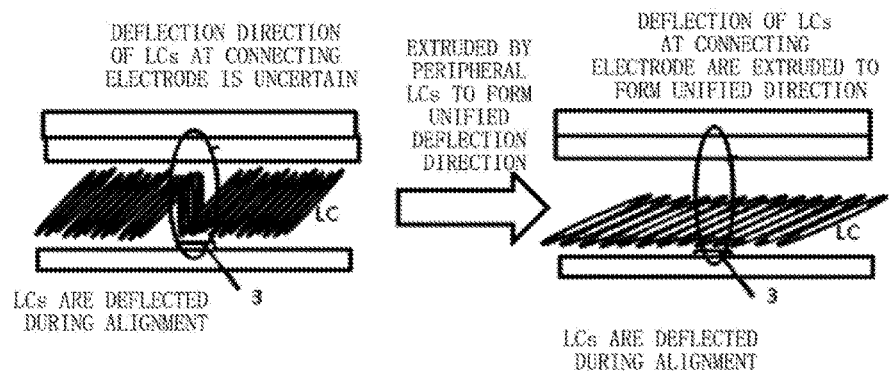
FIG. 8 is a schematic diagram where the liquid crystals are deflected when the alignment is performed in the present disclosure.

As shown in FIG. 2 and FIG. 8, when a voltage begins to be applied in an alignment process, a slightly disordered domain phenomenon occurs at the connecting electrode 3. As the alignment voltage strengthens, the liquid crystals (LC) at a periphery of the pixel electrode and in a vicinity of the keel electrodes 1 are orderly deflected by the common electrode 5, and the LCs at a periphery of the connecting electrode 3 are extruded to form a unified deflection direction, thereby completing the alignment at the connecting electrode 3, and avoiding the disordered domain phenomenon, so as to improve a transmissivity of the pixel electrode.

As shown in FIG. 2, which is the structural schematic diagram of Embodiment 1 of the present disclosure, the pixel electrode is disposed in the common electrode, the pixel electrode in Embodiment 1 includes two keel electrodes 1 crossing each other in a crisscross shape and dividing the pixel electrode into four electrode regions. A plurality of stripe-shaped branch electrodes 2 is disposed in each of the electrode regions, one of two ends of the branch electrodes 2 is connected to the keel electrodes 1, and the branch electrodes 2 in each of the electrode regions extend in the same direction and are disposed in parallel. A distance from periphery to the pixel electrode is equal to a distance from periphery to the common electrode 5. A connecting electrode 3 is disposed in each of the electrode regions and connected to two branch electrodes 2 disposed adjacently. The extension directions of the branch electrodes 2 in the adjacent two electrode regions are different. The connecting electrode 3 is disposed in a central portion of the electrode regions. Specifically, the branch electrodes 2 in the first electrode region 11 and the third electrode region 13 are parallel, and the branch electrodes 2 in the second electrode region 12 and the fourth electrode region 14 are parallel.

Figure 3:
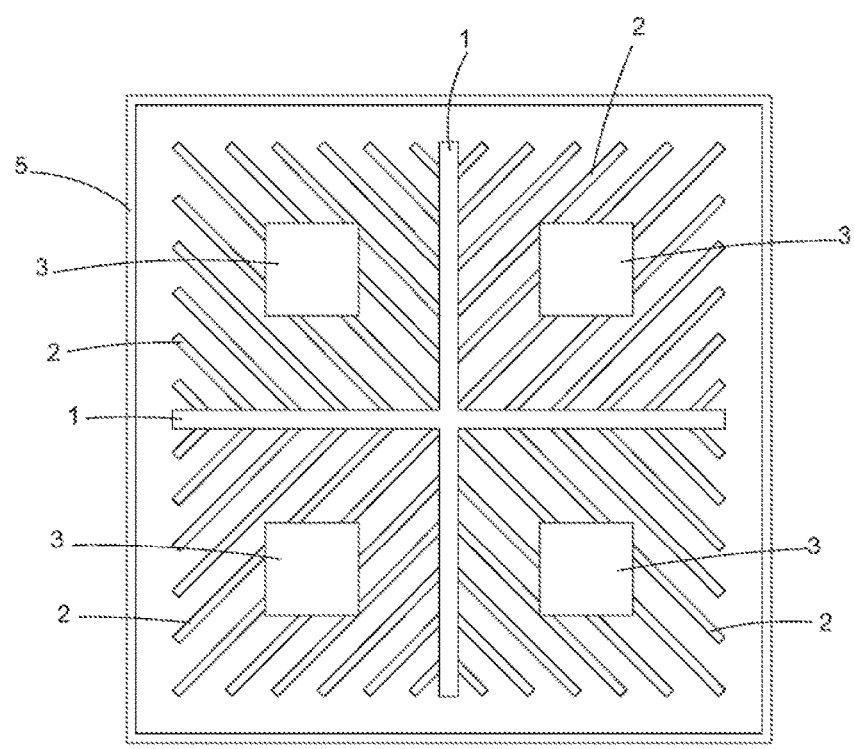
FIG. 3 is a structural schematic diagram of the pixel electrode of Embodiment 2 of the present disclosure.

As shown in FIG. 3, which is the structural schematic diagram of Embodiment 2 of the present disclosure, the pixel electrode is disposed in the common electrode, the pixel electrode in Embodiment 1 includes two keel electrodes 1 crossing each other in a crisscross shape and dividing the pixel electrode into four electrode regions. A plurality of stripe-shaped branch electrodes 2 is disposed in each of the electrode regions, one of two ends of the branch electrodes 2 is connected to the keel electrodes 1, and the branch electrodes 2 in each of the electrode regions extend in the same direction and are disposed in parallel. A distance from periphery to the pixel electrode is equal to a distance from periphery to the common electrode 5. A connecting electrode 3 is disposed in each of the electrode regions, which is square and connected to four branch electrodes 2. The extension directions of the branch electrodes 2 in the adjacent two electrode regions are different. The connecting electrode 3 is disposed in a central portion of the electrode regions. Specifically, the branch electrodes 2 in the first electrode region 11 and the third electrode region 13 are parallel, and the branch electrodes 2 in the second electrode region 12 and the fourth electrode region 14 are parallel.

Figure 4:
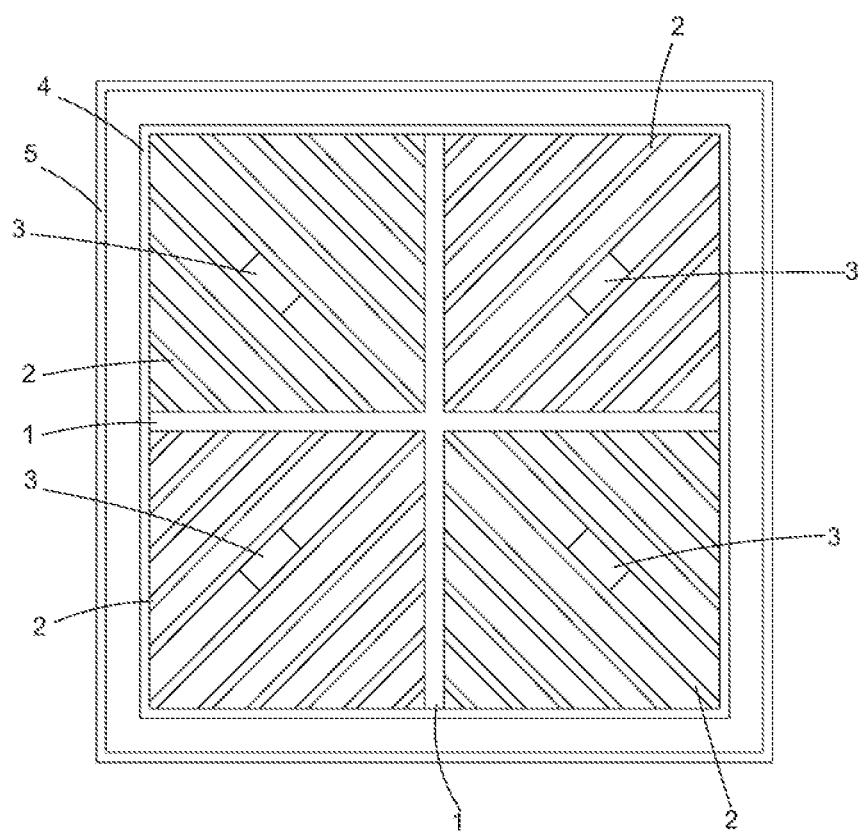
FIG. 4 is a structural schematic diagram of the pixel electrode of Embodiment 3 of the present disclosure.

As shown in FIG. 4, which is the structural schematic diagram of Embodiment 3 of the present disclosure, the pixel electrode is disposed in the common electrode; the pixel electrode in Embodiment 1 includes two keel electrodes 1 crossing each other in a crisscross shape and the border electrode 4, the keel electrodes 1 disposed in the border electrode 4 and dividing the pixel electrode into four electrode regions to constitute a field shape. A plurality of stripe-shaped branch electrodes 2 is disposed in each of the electrode regions, one of two ends of the branch electrodes 2 is connected to the keel electrodes 1, and the branch electrodes 2 in each of the electrode regions extend in the same direction and are disposed in parallel, and a distance from periphery to the border electrode 4 is equal to a distance from periphery to the common electrode 5. A connecting electrode 3 is disposed in each of the electrode regions and connected to two branch electrodes 2 disposed adjacently. The extension directions of the branch electrodes 2 in the adjacent two electrode regions are different. The connecting electrode 3 is disposed in a central portion of the electrode regions. Specifically, the branch electrodes 2 in the first electrode region 11 and the third electrode region 13 are parallel, and the branch electrodes 2 in the second electrode region 12 and the fourth electrode region 14 are parallel.

Figure 5:
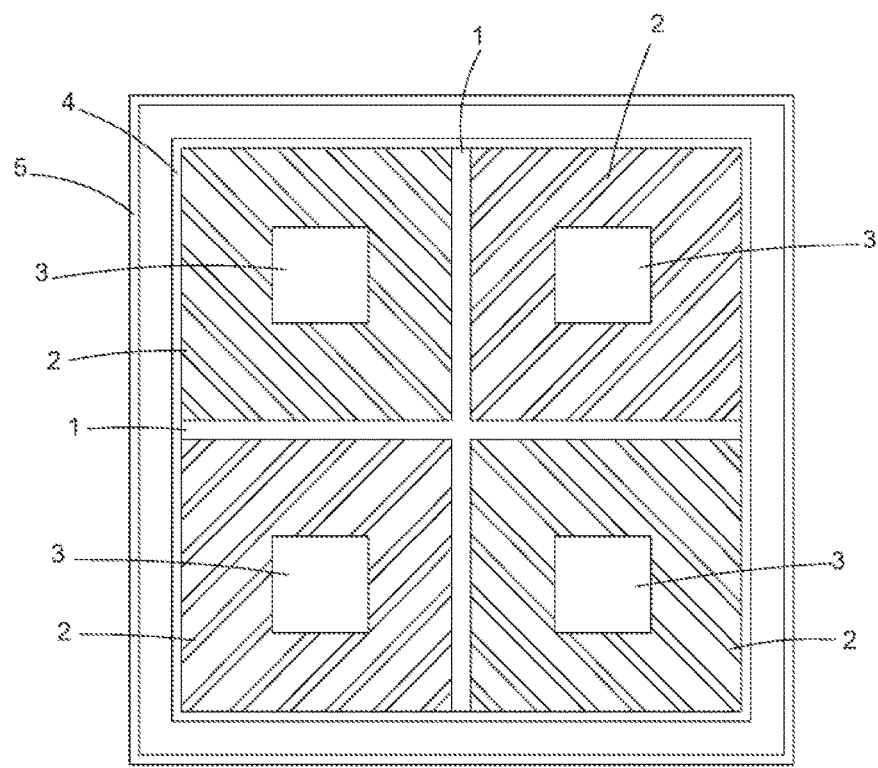
FIG. 5 is a structural schematic diagram of the pixel electrode of Embodiment 4 of the present disclosure.

As shown in FIG. 5, which is the structural schematic diagram of Embodiment 4 of the present disclosure, the pixel electrode is disposed in the common electrode; the pixel electrode in Embodiment 1 includes two keel electrodes 1 crossing each other in a crisscross shape and the border electrode 4, the keel electrodes 1 disposed in the border electrode 4, and dividing the pixel electrode into four electrode regions to constitute a field shape. A plurality of stripe-shaped branch electrodes 2 is disposed in each of the electrode regions, one of two ends of the branch electrodes 2 is connected to the keel electrodes 1, and the branch electrodes 2 in each of the electrode regions extend in the same direction and are disposed in parallel. A distance from periphery to the pixel electrode is equal to a distance from periphery to the common electrode 5. A connecting electrode 3 is disposed in each of the electrode regions, which is square and connected to four branch electrodes 2. The extension directions of the branch electrodes 2 in the adjacent two electrode regions are different. The connecting electrode 3 is disposed in a central portion of the electrode regions. Specifically, the branch electrodes 2 in the first electrode region 11 and the third electrode region 13 are parallel, and the branch electrodes 2 in the second electrode region 12 and the fourth electrode region 14 are parallel.

Figure 6:
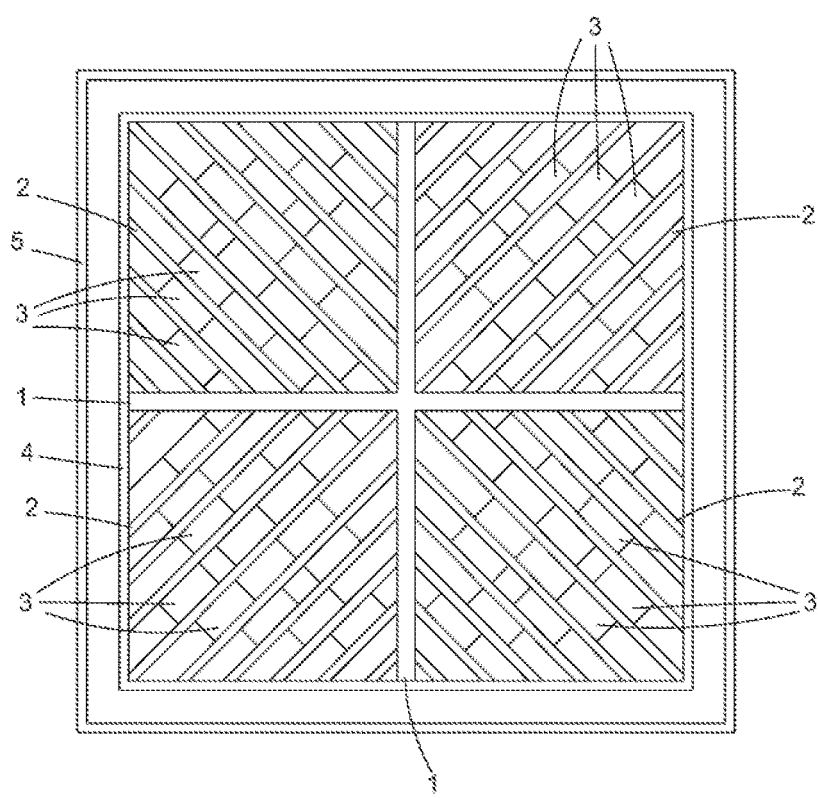
FIG. 6 is a structural schematic diagram of the pixel electrode of Embodiment 5 of the present disclosure.

As shown in FIG. 6, which is the structural schematic diagram of Embodiment 5 of the present disclosure, the pixel electrode is disposed in the common electrode, the pixel electrode in Embodiment 1 includes two keel electrodes 1 crossing each other in a crisscross shape and the border electrode 4, the keel electrodes 1 disposed in the border electrode 4 and dividing the pixel electrode into four electrode regions to constitute a field shape. A plurality of stripe-shaped branch electrodes 2 is disposed in each of the electrode regions, one of two ends of the branch electrodes 2 is connected to the keel electrodes 1, and the branch electrodes 2 in each of the electrode regions extend in the same direction and are disposed in parallel. A distance from periphery to the border electrode 4 is equal to a distance from periphery to the common electrode 5. A plurality of connecting electrodes 3 is disposed in each of the electrode regions, and connected to two branch electrodes 2 disposed adjacently. The extension directions of the branch electrodes 2 in the adjacent two electrode regions are different. The connecting electrodes 3 are distributed in the electrode regions. Specifically, the branch electrodes 2 in the first electrode region 11 and the third electrode region 13 are parallel, and the branch electrodes 2 in the second electrode region 12 and the fourth electrode region 14 are parallel.

Figure 7:
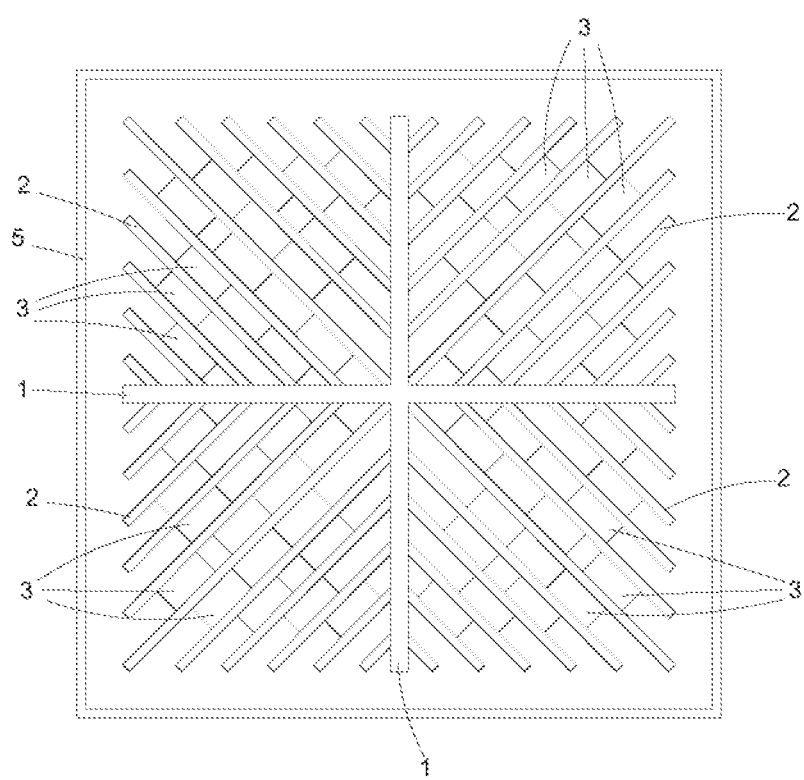
FIG. 7 is a structural schematic diagram of the pixel electrode of Embodiment 6 of the present disclosure.

As shown in FIG. 7, which is the structural schematic diagram of Embodiment 6 of the present disclosure, the pixel electrode is disposed in the common electrode, the pixel electrode in Embodiment 1 includes two keel electrodes 1 crossing each other in a crisscross shape and dividing the pixel electrode into four electrode regions to constitute a field shape. A plurality of stripe-shaped branch electrodes 2 is disposed in each of the electrode regions, one of two ends of the branch electrodes 2 is connected to the keel electrodes 1, and the branch electrodes 2 in each of the electrode regions extend in the same direction and are disposed in parallel. A distance from periphery to the pixel electrode is equal to a distance from periphery to the common electrode 5. A plurality of connecting electrodes 3 is disposed in each of the electrode regions, and connected to two branch electrodes 2. The two branch electrodes 2 are disposed adjacently, and the extension directions of the branch electrodes 2 in the adjacent two electrode regions are different. The connecting electrodes 3 are distributed in the electrode regions. Specifically, the branch electrodes 2 in the first electrode region 11 and the third electrode region 13 are parallel, and the branch electrodes 2 in the second electrode region 12 and the fourth electrode region 14 are parallel.

In Embodiments 5 and 6, the adjacent two branch electrodes 2 are disposed with the plurality of connecting electrodes 3 therebetween, which is not specifically defined here and may be selected according to the actual needs.

The present disclosure further provides an array substrate, including the above pixel electrode, which is not described again here.

Although the present disclosure is illustrated and described with reference to the specific embodiments, those skilled in the art will understand that: various changes in forms and details may be made therein without departing from the spirit and the scope of the present disclosure as defined by the claims and the equivalents thereof.

The invention claimed is:
1. A pixel electrode comprising:
  keel electrodes for dividing the pixel electrode into at least two electrode regions;
  a plurality of stripe-shaped branch electrodes disposed in each of the electrode regions, one of two ends of the branch electrodes connecting to the keel electrodes, wherein the branch electrodes in each of the electrode regions extend in the same direction and disposed in parallel;
  at least one connecting electrode disposed in each of the electrode regions, and connecting to at least four branch electrodes; and
  a rectangular border electrode disposed with the keel electrodes, the branch electrodes and the connecting electrode therein, and connected to two ends of the keel electrodes and the other end of the branch electrodes.

2. The pixel electrode of claim 1, wherein extension directions of the branch electrodes in adjacent two electrode regions are different.

3. The pixel electrode of claim 1, wherein the keel electrodes are disposed to be two, and cross each other in a crisscross shape.

4. The pixel electrode of claim 1, wherein a closest distance between the connecting electrode and the keel electrodes is greater than or equal to 15 µm.

5. The pixel electrode of claim 1, wherein a length and a width of the connecting electrode are 2 to 10 µm.

6. The pixel electrode of claim 1, wherein a width of the keel electrodes is greater than 3 µm.

7. The pixel electrode of claim 1, wherein the connecting electrode in each of the electrode regions is disposed to be one, and connected to more than three branch electrodes.

8. The pixel electrode of claim 1, wherein the connecting electrode in each of the electrode regions is disposed to be more than two.

9. An array substrate comprising a pixel electrode, wherein the pixel electrode comprises:
  keel electrodes for dividing the pixel electrode into at least two electrode regions;
  a plurality of stripe-shaped branch electrodes disposed in each of the electrode regions, one of two ends of the branch electrodes connecting to the keel electrodes, wherein the branch electrodes in each of the electrode regions extend in the same direction and disposed in parallel;
  at least one connecting electrode disposed in each of the electrode regions, and connecting to at least four branch electrodes; and
  a rectangular border electrode disposed with the keel electrodes, the branch electrodes and the connecting electrode therein, and connected to two ends of the keel electrodes and the other end of the branch electrodes.

10. The array substrate of claim 9, wherein extension directions of the branch electrodes in adjacent two electrode regions are different.

11. The array substrate of claim 9, wherein the keel electrodes are disposed to be two, and cross each other in a crisscross shape.

12. The array substrate of claim 9, wherein a closest distance between the connecting electrode and the keel electrodes is greater than or equal to 15 μm.

13. The array substrate of claim 9, wherein a length and a width of the connecting electrode are 2 to 10 μm.

14. The array substrate of claim 9, wherein a width of the keel electrodes is greater than 3 μm.

15. The array substrate of claim 9, wherein the connecting electrode in each of the electrode regions is disposed to be one, and connected to more than three branch electrodes.

16. The array substrate of claim 9, wherein the connecting electrode in each of the electrode regions is disposed to be more than two.

\* \* \* \* \*